(12) United States Patent
Aoba

(10) Patent No.: US 8,705,795 B2
(45) Date of Patent: Apr. 22, 2014

(54) INFORMATION PROCESSING APPARATUS, INFORMATION PROCESSING METHOD, AND PROGRAM

(75) Inventor: Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 13/291,655

(22) Filed: Nov. 8, 2011

(65) Prior Publication Data

US 2012/0128204 A1 May 24, 2012

(30) Foreign Application Priority Data

Nov. 19, 2010 (JP) ................................. 2010-259318

(51) Int. Cl.
*G06T 7/00* (2006.01)
*G06K 9/62* (2006.01)

(52) U.S. Cl.
USPC ............ 382/103; 382/154; 382/217; 382/291

(58) Field of Classification Search
None
See application file for complete search history.

(56) References Cited

U.S. PATENT DOCUMENTS

| | | | | |
|---|---|---|---|---|
| 6,748,104 B1 * | 6/2004 | Bachelder et al. | ............ | 382/151 |
| 2006/0204079 A1 * | 9/2006 | Yamaguchi | ................... | 382/154 |

FOREIGN PATENT DOCUMENTS

| | | |
|---|---|---|
| JP | 2002-63567 A | 2/2002 |
| JP | 2002-109539 A | 4/2002 |
| JP | 2007-219765 A | 8/2007 |
| JP | 2009-128075 A | 6/2009 |

* cited by examiner

*Primary Examiner* — Jon Chang
(74) *Attorney, Agent, or Firm* — Canon USA Inc. IP Division

(57) ABSTRACT

An information processing apparatus includes a selection unit configured to select a plurality of specific areas of a target object, a learning unit configured to learn a detection model that relates to each of the plurality of specific areas, a generation unit configured to generate an area combination as a combination of specific areas selected from the plurality of specific areas, a recognition unit configured to recognize the target object based on the detection model and the area combination, and an addition unit configured to add a new specific area based on a recognition result obtained by the recognition unit. If the new specific area is added by the addition unit, the learning unit further learns a detection model that relates to the new specific area.

20 Claims, 11 Drawing Sheets

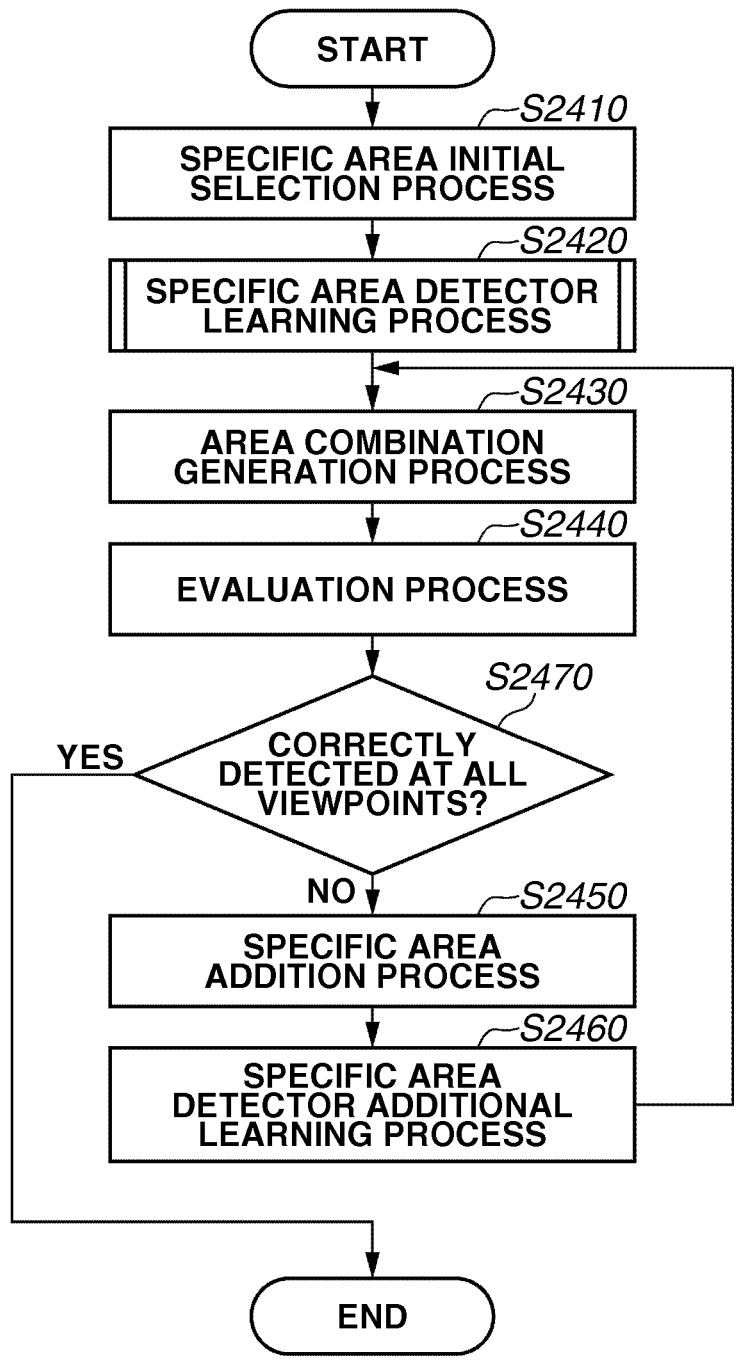

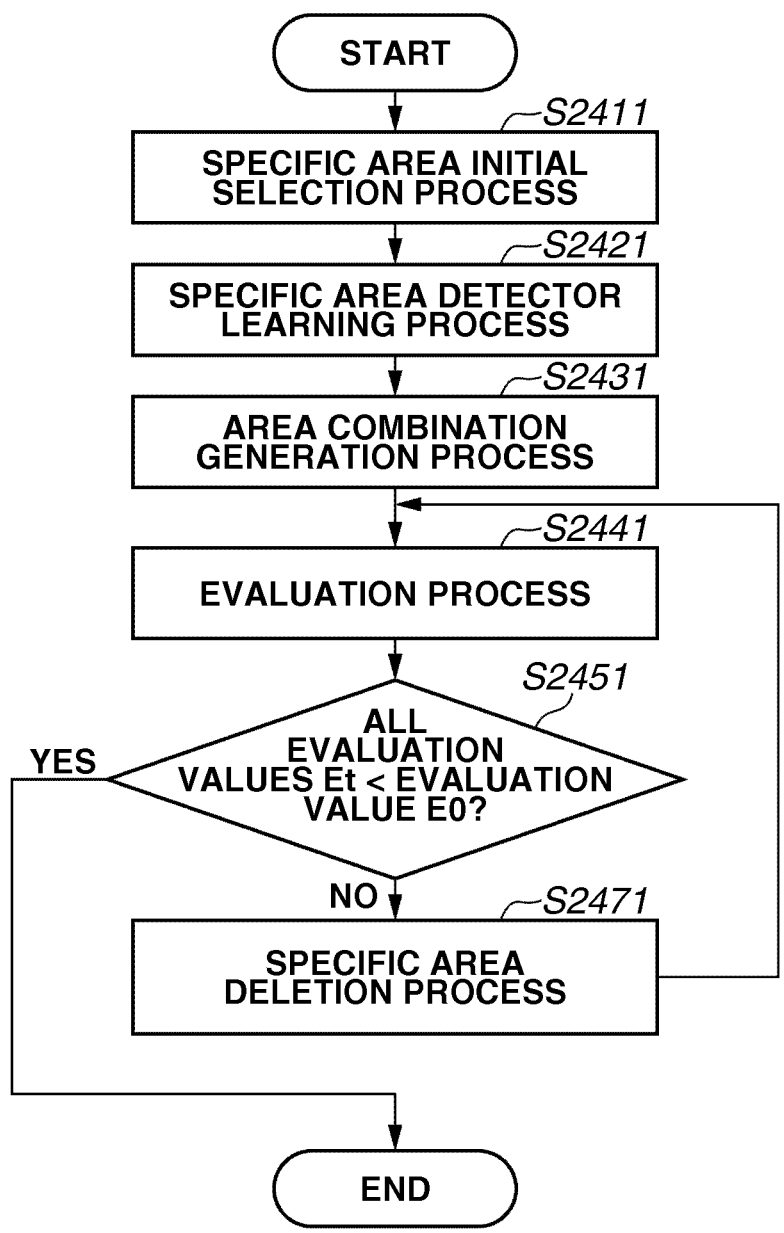

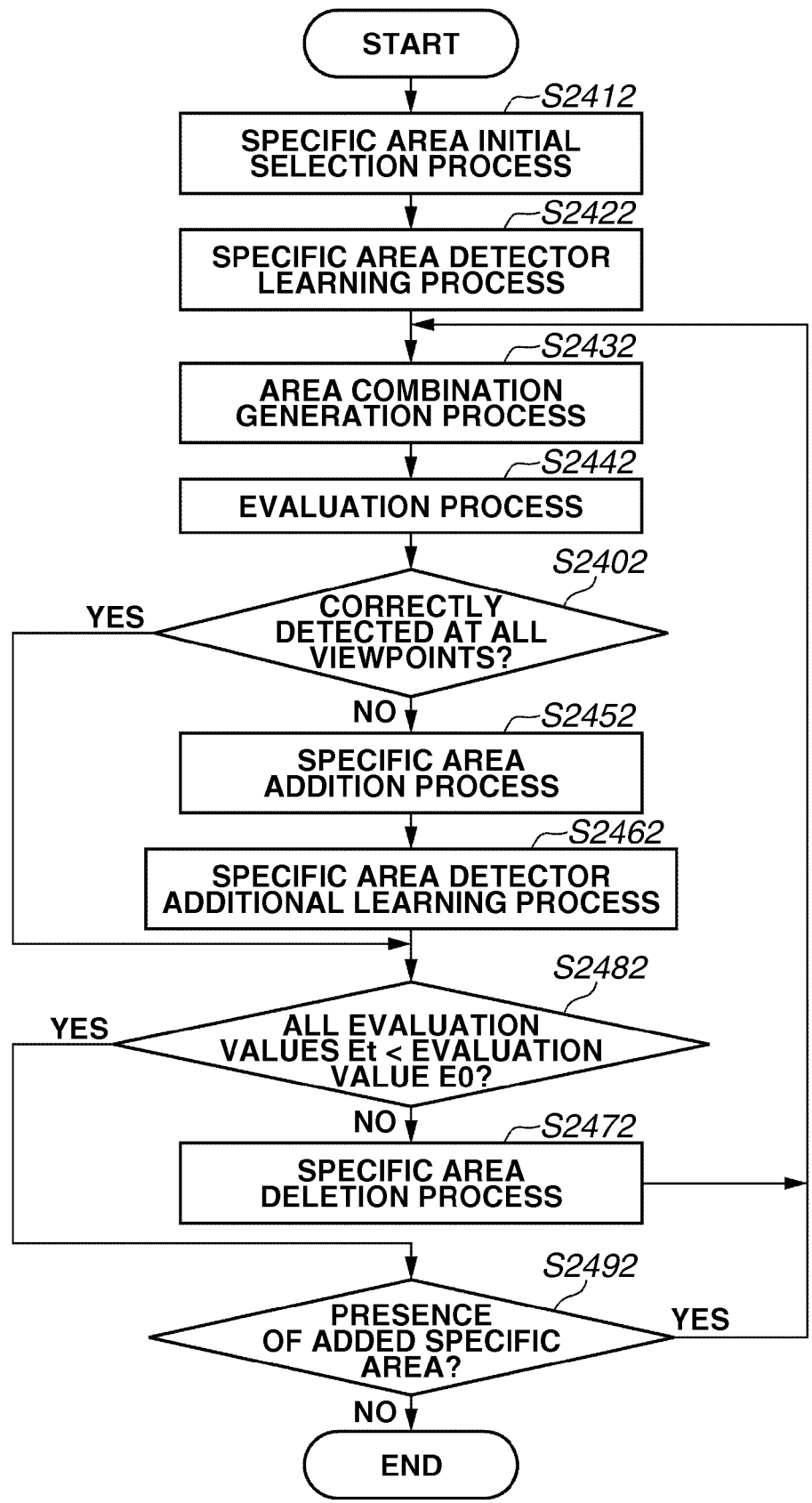

INFORMATION PROCESSING APPARATUS, INFORMATION PROCESSING METHOD, AND PROGRAM

BACKGROUND OF THE INVENTION

1. Field of the Invention

The present invention relates to a technique useful in estimating the position and orientation of a target object.

2. Description of the Related Art

In the field of recognition using visual information, there are various types of research and development activities that have been carried out to estimate the position and orientation of a three-dimensional object. For example, industrial robots and experimental Humanoid robots require three-dimensional information to perform random picking and there is the increasing necessity for the three-dimensional information.

To obtain three-dimensional information representing the position and orientation of a target object, there is a conventional method using three-dimensional sensors, such as stereo cameras and laser range finders. If a target object has a known shape, a monocular camera can be used to estimate the position and orientation of the target object.

As discussed in Japanese Patent Application Laid-Open No. 2002-63567, it is conventionally feasible to estimate the position and orientation of a three-dimensional target object based on an image captured by a monocular camera.

More specifically, the technique discussed in Japanese Patent Application Laid-Open No. 2002-63567 includes associating feature points of a learning image with three-dimensional coordinates thereof, and calculating a transformation matrix through an optimization calculation capable of minimizing errors based on three-dimensional coordinates of feature points of the learning image that coincide with feature points obtained from an input image.

The technique discussed in Japanese Patent Application Laid-Open No. 2002-63567 further includes using the obtained transformation matrix to generate an image from a model, and obtaining a finalized orientation by correcting an estimated orientation based on the generated image.

As discussed in Japanese Patent Application Laid-Open No. 2002-109539, it is conventionally feasible to obtain a transformation matrix using three of feature points obtained from an input image.

A technique discussed in Japanese Patent Application Laid-Open No. 2007-219765 includes obtaining learning images captured from a plurality of viewpoints, comparing local feature information of respective learning images with local feature information obtained from an input image, and outputting viewpoint information of the most similar learning image as orientation of the input image.

As discussed in Japanese Patent Application Laid-Open No. 2009-128075, the distance sensor can be conventionally used to estimate the position and orientation a three-dimensional object. More specifically, the technique discussed in Japanese Patent Application Laid-Open No. 2009-128075 includes calculating three-dimensional feature information of input data, obtaining a corresponding relationship with three-dimensional feature information relating to a plurality of feature points of a model, and calculating the position and orientation of an object using rigid-body transformation.

In this case, selection of a plurality of feature points is performed considering operational restraint conditions (e.g., the front/back of an object) and a mixing state of classes as a clustering result of feature information to effectively select the points in the detection.

According to the technique discussed in Japanese Patent Application Laid-Open No. 2002-63567 and the technique discussed in Japanese Patent Application Laid-Open No. 2002-109539, the selection of feature points is performed manually and intentionally. For example, if the target object is a human, feature points to be selected are eyes and a mouth. In other words, extracting the most useful feature points from a learning image for three-dimensional position/orientation estimation processing is not mentioned in Japanese Patent Application Laid-Open No. 2002-63567 and in Japanese Patent Application Laid-Open No. 2002-109539.

According to the technique discussed in Japanese Patent Application Laid-Open No. 2007-219765, it is fundamental that all orientations are discriminated as different classes and, therefore, the obtained solutions are discrete.

Therefore, the angular resolution of a discriminating system is substantially determined by an angular resolution in the change of viewpoint when a learning image is acquired. Therefore, if the resolution in shooting angle is increased to improve the accuracy of each solution, it becomes difficult to identify the orientation because of an increase in the number of similar images having different orientations.

According to the technique discussed in Japanese Patent Application Laid-Open No. 2009-128075, useful feature points of a model are selected from the clustering result of feature information. However, the possibility that the useful feature points may be biased undesirably depending on the viewpoint is not mentioned. Even if many feature points are selected, these feature points may be the ones visible from a limited number of viewpoints.

SUMMARY OF THE INVENTION

Exemplary embodiments of the present invention are directed to an information processing apparatus that can select useful specific areas, without causing any bias that may occur depending on the viewpoint, in estimating the position and orientation of a target object.

According to an aspect of the present invention, an information processing apparatus includes a selection unit configured to select a plurality of specific areas of a target object, a learning unit configured to learn a detection model that relates to each of the plurality of specific areas, a generation unit configured to generate an area combination as a combination of specific areas selected from the plurality of specific areas, a recognition unit configured to recognize the target object based on the detection model and the area combination, and an addition unit configured to add a new specific area based on a recognition result obtained by the recognition unit. The learning unit is configured to learn a detection model that relates to the new specific area if the new specific area is added by the addition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating detailed processing of a specific area selection process (step S2400) according to the first exemplary embodiment of the present invention.

FIG. 10 is a flowchart illustrating detailed processing of the specific area selection process (step S2400) according to a second exemplary embodiment of the present invention.

FIG. 11 is a flowchart illustrating detailed processing of the specific area selection process (step S2400) according to a third exemplary embodiment of the present invention.

DESCRIPTION OF THE EMBODIMENTS

Various exemplary embodiments, features, and aspects of the invention will be described in detail below with reference to the drawings.

Figure 1:
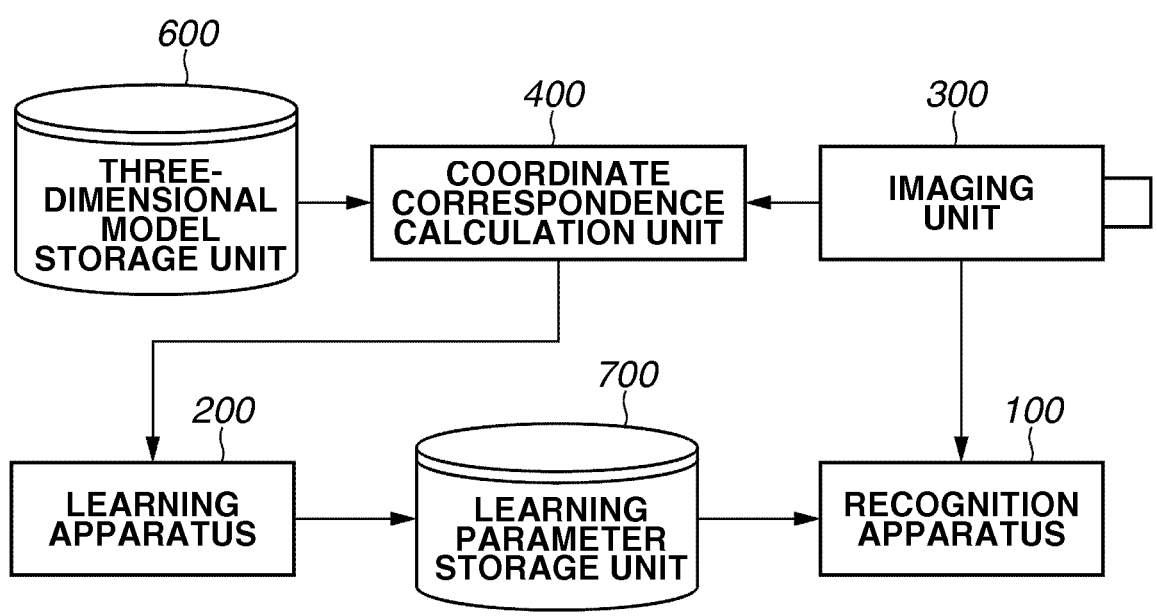
FIG. 1 is a block diagram illustrating a functional configuration of a specific area selection system according to a first exemplary embodiment of the present invention.

FIG. 1 is a block diagram illustrating a functional configuration of a specific area selection system according to a first exemplary embodiment of the present invention. First, the specific area selection system according to the present exemplary embodiment is schematically described below.

An imaging unit 300 can transmit image data, if captured, to a coordinate correspondence calculation unit 400. The coordinate correspondence calculation unit 400 can calculate a corresponding relationship between the acquired image data and each point of a three-dimensional model stored in a three-dimensional model storage unit 600. A learning apparatus 200 can perform learning processing using the corresponding relationship between the image data and the three-dimensional model and store the obtained learning result in a learning parameter storage unit 700.

Further, the imaging unit 300 can also transmit the acquired image data to a recognition apparatus 100. The recognition apparatus 100 can perform recognition processing on the image data according to the learning result stored in the learning parameter storage unit 700 and can obtain a recognition processing result. The recognition processing according to the present exemplary embodiment includes obtaining the position and orientation of a three-dimensional object based on the image data obtained by the imaging unit 300. In other words, the recognition apparatus 100 can estimate the position and orientation of a three-dimensional object.

Figure 2:
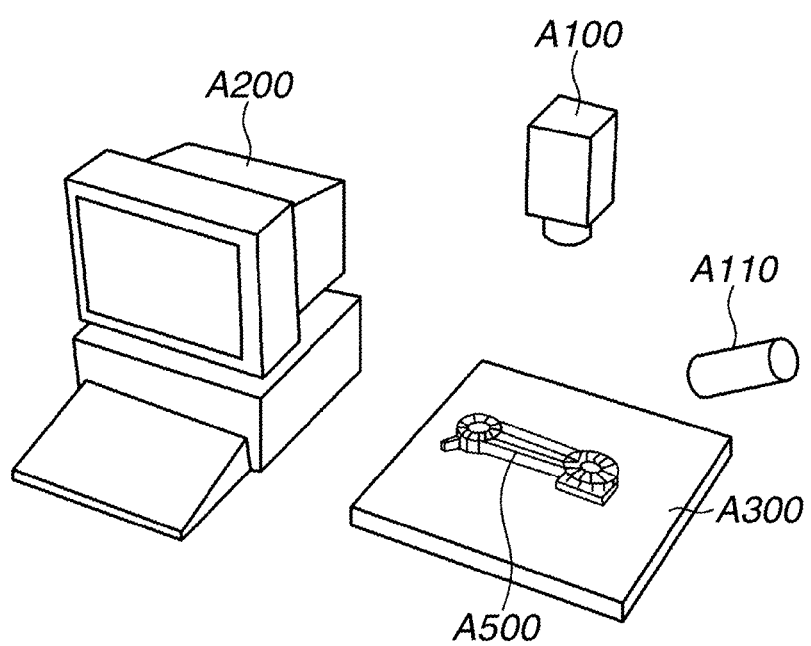
FIG. 2 illustrates an example configuration of the specific area selection system according to the first exemplary embodiment of the present invention.

FIG. 2 illustrates an example configuration of the specific area selection system. The illustration of FIG. 2 includes a three-dimensional object A500. A stage A300 is provided to mount the three-dimensional object A500. A camera A100 can capture an image of the three-dimensional object A500 and acquire image data of the three-dimensional object A500.

A laser illuminator A110 is driven by a Galvano mirror or the like and operable in cooperation with the camera A100 to obtain distance map data of the three-dimensional object A500 according to the optical cutting method. The camera A100 and the laser illuminator A110 is a combination that corresponds to the imaging unit 300 illustrated in FIG. 1.

It is presumed that the camera A100 and the laser illuminator A110 are calibrated beforehand to perform a distance measurement according to the optical cutting method. In the present exemplary embodiment, the distance measurement according to the optical cutting method is employed as an apparatus configured to perform recognition processing. However, the distance measurement method is not limited to the optical cutting method. The method according to the present invention is not limited to a specific distance measurement method and is selectable from various methods, such as space coding using a projector, instead of using the laser illuminator A110, or stereo measurement using a plurality of cameras.

Further, as described below, the method according to the present exemplary embodiment does not always require distance information of a three-dimensional object and is applicable to an apparatus configuration of a monocular imaging system including a single camera.

A computer A200 can perform recognition processing on a three-dimensional object. The computer A200 is a device that corresponds to the recognition apparatus 100 illustrated in FIG. 1. Further, a learning result obtained through the learning processing can be stored in an internal memory (not illustrated) of the computer A200. The internal memory of the computer A200 is a storage medium that corresponds to the learning parameter storage unit 700 illustrated in FIG. 1.

The computer that can perform recognition processing is not limited to the above-described apparatus, which is independent from the camera A100. For example, the camera A100 can be configured to have a recognition processing function comparable to that of the computer A200. The configuration illustrated in FIG. 2 is an example configuration according to the present exemplary embodiment, although the present invention is not limited to the illustrated example configuration.

Figure 3:
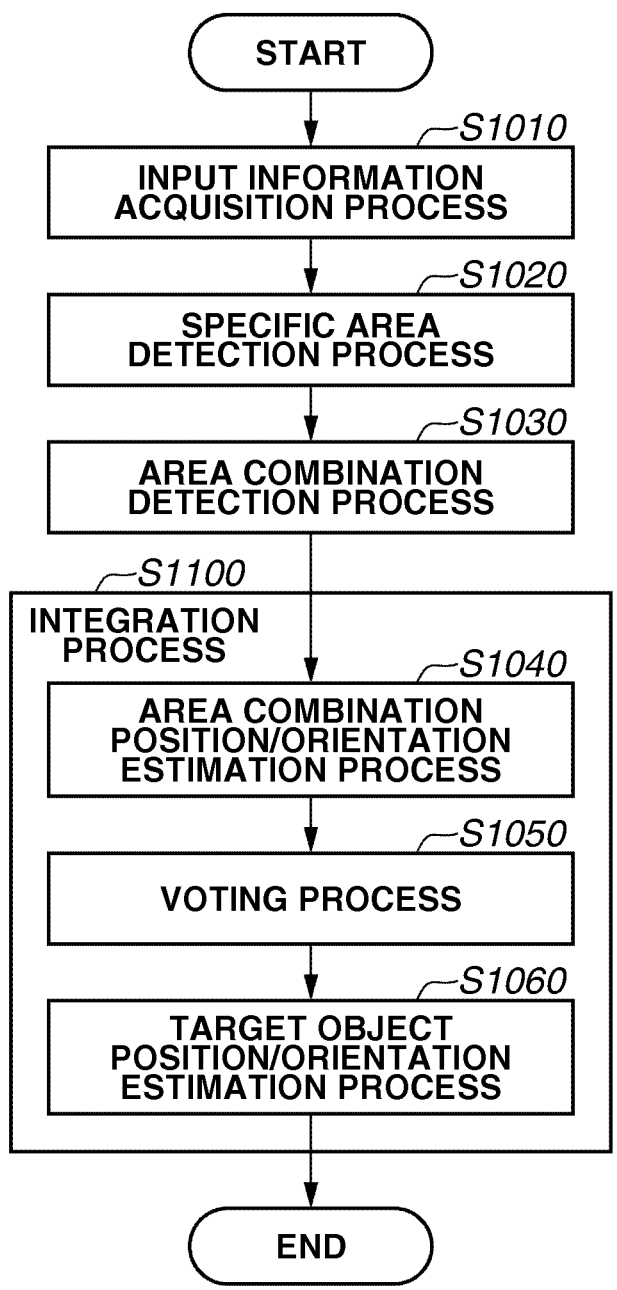
FIG. 3 is a flowchart illustrating overall processing that can be performed by the specific area selection system according to the first exemplary embodiment of the present invention.

FIG. 3 is a flowchart illustrating example processing that can be performed by the specific area selection system according to the present exemplary embodiment. Hereinafter, the example processing performed by the specific area selection system is described in detail below with reference to FIG. 3.

First, in step S1010 (i.e., an input information acquisition process), the computer A200 acquires image data I and distance map data Zmap using the camera A100 and the laser illuminator A110. The distance map data Zmap is required to obtain a depth distance Zmap(x) in the camera coordinate system at a position corresponding to an image coordinate point x on the image data I.

A conventionally known triangulation method is employable to calculate the distance map data, although not described in detail. It is feasible to calculate an X coordinate map (which is referred to as "Xmap") and a Y coordinate map (which is referred to as "Ymap") in the camera coordinate system based on the distance map data Zmap and calibration values for the distance measurement.

Subsequently, in step S1020 (i.e., a specific area detection process), the computer A200 detects specific areas of a three-dimensional object through the learning processing as described below. In the present exemplary embodiment, the specific area is a local area having a predetermined size on a target object obtained as a three-dimensional model (i.e., a three-dimensional object).

Figure 4A:
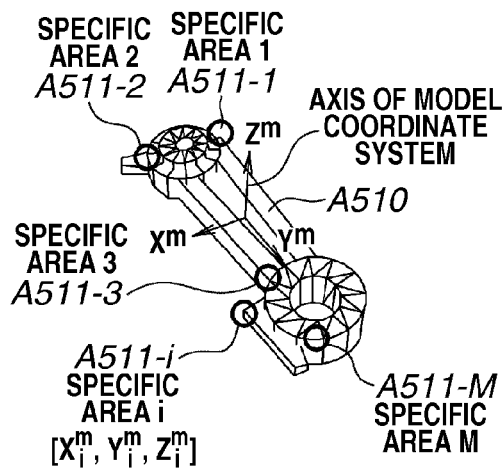
FIGS. 4A to 4E illustrate recognition processing according to the first exemplary embodiment of the present invention.

For example, if the target object is a three-dimensional object A510 illustrated in FIG. 4A, the computer A200 detects specific positions A511-1 to A511-M of the three-dimensional object A510. In the example illustrated in FIG. 4A, the total number of specific areas is M. These specific areas have positional information in the model coordinate system, respectively. $X^m_i = [X^m_i, Y^m_i, Z^m_i]^T$ represents positional information of a specific area i in the model coordinate system, in which T represents the transposition of the matrix.

Figure 4B:
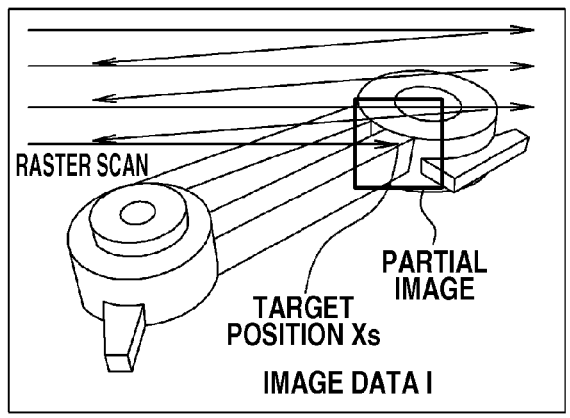

The computer A200 performs raster scanning on the image data I as illustrated in FIG. 4B to extract a partial image having the center at a target position $x_s$. The computer A200 detects a specific area using feature information extracted from the extracted partial image. The computer A200 calculates a clipping size "r" of the partial image according to the following formula (1), based on a fixed size R and the depth distance of the target position $x_s$ in the model coordinate system determined beforehand.

$$r = \frac{f}{Zmap(X_s)\delta} R \quad (1)$$

The above-described formula (1) includes camera parameters δ and f, in which δ represents a pixel size of the camera and f represents a focal length of the camera. For example, when R=20 mm, if the camera parameters are f=24 mm and δ=0.03 mm/pixel and the map data is Zmap $(x_s)$=800 mm, the clipping size r is equal to 20 pixels (i.e., r=20).

In this case, the computer A200 can clip an area having a size of 20 pixels×20 pixels. The feature information can be any one of various types, such as Histograms of Oriented Gradients (HOG), which are conventionally known. However, the feature information according to the present invention is not limited to a specific type. Further, the feature information is not limited to image feature information, such as the HOG. For example, the feature information can be three-dimensional feature information, such as Spin Image that is conventionally known, which uses three-dimensional information based on Xmap, Ymap, and Zmap, instead of using the image data I.

In the present exemplary embodiment, $A_i = \{x_{i1}, x_{i2}, \ldots, x_{iNi}\}$ represents a group of detection areas detected as an image search result of the specific area i, in which $x_{i1}$ indicates the position of the first detection area of the image detected in the specific area i and a point in the image coordinate system. $N_i$ represents the total number of detection areas detected in the specific area i. Further, $X_{i1} = [X_{i1}, Y_{i1}, Z_{i1}] = [Xmap(x_{i1}), Ymap(x_{i1}), Zmap(x_{i1})]$ represents the position of each detection area $x_{i1}$ in the camera coordinate system.

In step S1030 (i.e., an area combination detection process), the computer A200 detects an area combination (i.e., a combination of specific areas defined beforehand) from the specific areas detected in step S1020. In the present exemplary embodiment, the area combination is a combination of specific areas that are required to estimate the position and orientation of a three-dimensional object. It is presumed that the area combination can be defined beforehand in the learning processing. When the distance measurement is performed to obtain the position of each specific area in the camera coordinate system, it is required to obtain positional information of at least three points in the camera coordinate system to determine the position and orientation of the specific area.

Figure 4C:
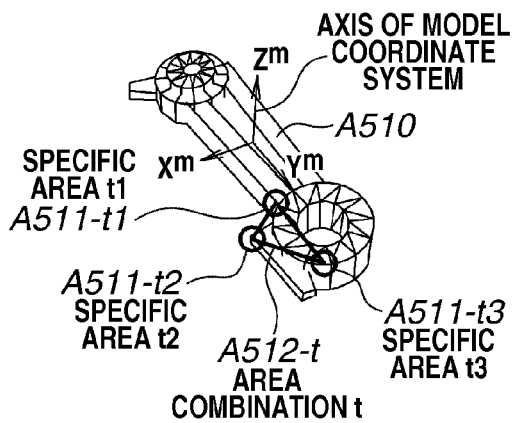

In the present exemplary embodiment, the computer A200 performs estimation with respect to the position and orientation based on a combination of three specific areas. Hereinafter, the area combination of three specific areas is referred to as a "triplet." The area combination according to the present invention is not limited to the above-described three points. When T area combinations are defined beforehand as triplets, specific areas that cooperatively constitute an area combination t are referred to as t1, t2, and t3, respectively (see FIG. 4C). The specific areas t1, t2, and t3 can be any three of the above-described M specific areas. Further, each of the specific areas can belong to two or more area combinations.

If the constituent components (i.e., specific areas) of the area combination t is detected in the specific area detection process (step S1020), the computer A200 determines whether the relative positional relationship between the specific areas satisfies geometrical constraint conditions in the following manner. If the following formula (2) is satisfied for camera coordinate values $X_{t1n1}$ and $X_{t2n2}$ of arbitrary detection areas in detection results $A_{t1}$ and $A_{t2}$ of specific areas t1 and t2, the computer A200 determines that the distance relationship between $X_{t1n1}$ and $X_{t2n2}$ is correct.

$$|L(X_{t1n1}, X_{t2n2}) - L(X_{t1}^m, X_{t2}^m)| \leq \delta L_{t1t2} \quad (2)$$

In formula (2), it is presumed that the function $L(X_1, X_2)$ represents the distance L2 between a position vector $X_1$ and a position vector $X_2$. $\delta L_{t1t2}$ is a permissible error of the distance between the specific areas t1 and t2, and is a parameter variable depending on the size of a three-dimensional object or image resolution thereof.

For example, if a permissible detection error is 10 pixels when the image resolution in a predetermined working distance is 1 mm/pixel, the value of $\delta L_{t1t2}$ can be set to 10 mm (i.e., $\delta L_{t1t2}$=10 mm). Further, the computer A200 determines whether a distance relationship between the specific area t2 and the specific area t3 is correct, similarly.

If it is determined that both of the above-described distance relationships are correct, and if the following formula (3) is satisfied with respect of the angle formed between two sides thereof, the computer A200 determines that the area combination composed of specific areas t1n1, t2n2, and t3n3 satisfies the geometrical constraints and recognizes it as a detected area combination.

$$|\theta_{m1n2n3} - \theta_t^m| \leq \delta\theta_t \quad (3)$$

In formula (3), $\theta_{m1n2n3}$ is an angle formed between a vector $X_{t1n1} - X_{t2n2}$ and a vector $X_{t3n3} - X_{t2n2}$, and $\theta_t^m$ is an angle formed between a vector $X^m_{t1} - X^m_{t2}$ and a vector $X^m_{t3} - X^m_{t2}$. $\delta\theta_t$ is a permissible error of the angle formed between two sides of the area combination t. For example, the value of $\delta\theta_t$ can be set to 15 degrees (i.e., $\delta\theta_t$=15). If the above-described geometrical constraints are not satisfied, the computer A200 determines that the area combination t is a non-detected area combination and does not use the area combination t in the subsequent processing.

Figure 4D:
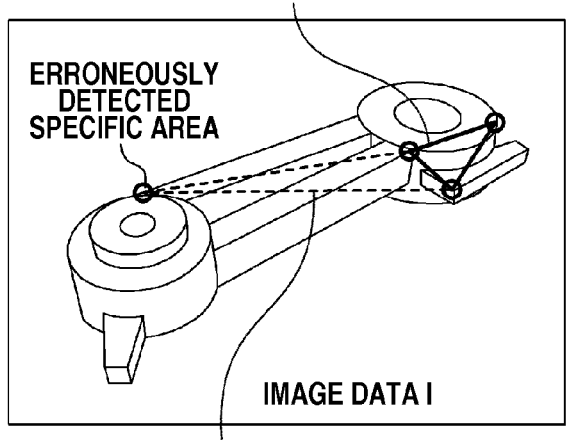

Through the above-described geometrical constraints determination, for example, if an error detection of a specific area occurs as illustrated in FIG. 4D, the computer A200 can refer to a relative positional relationship with detection positions of other specific areas constituting the area combination to determine whether the area combination is a detected area combination or a non-detected area combination.

When the computer A200 performs the above-described geometrical constraints determination for all specific areas that constitute T area combinations, the computer A200 can reduce the number of detected area combinations that can be effectively used to estimate the position and orientation of a three-dimensional object included in the image data I.

In step S1100 (i.e., an integration process), the computer A200 calculates an estimation result with respect to the position and orientation for each detected area combination and obtains a recognition result by integrating the result. The integration process (i.e., step S1100) includes an area combination position/orientation estimation process (see step S1040), a voting process (see step S1050), and a target object position/orientation estimation process (see step S1060).

Figure 4E:
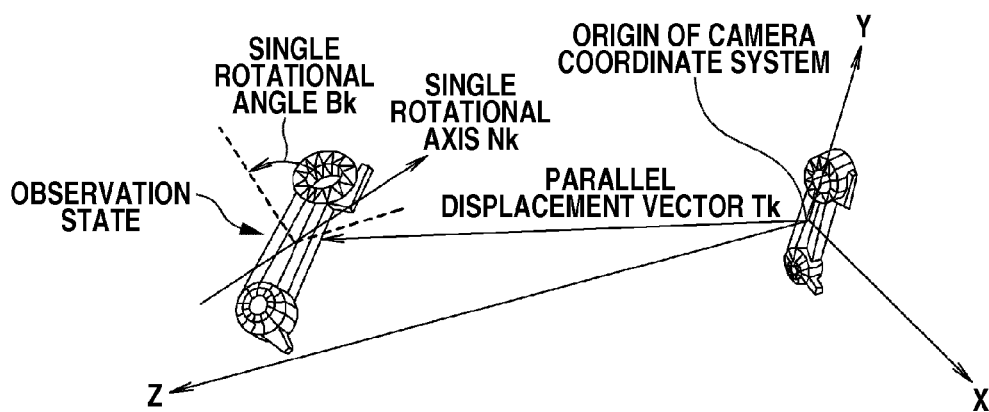

In step S1040 (i.e., the area combination position/orientation estimation process), the computer A200 estimates the position and orientation of a three-dimensional object in the area combination detected in the area combination detection process S1030. In the present exemplary embodiment, it is presumed that the position and orientation of a three-dimensional object can be expressed using a parallel displacement vector, a single rotational axis, and a single rotational angle, when the three-dimensional object moves to an observation state via a parallel displacement and a single turn from a state where the model coordinate system coincides with the camera coordinate system, as illustrated in FIG. 4E.

More specifically, the position of a three-dimensional object estimated from the detected area combination can be expressed using a parallel displacement vector $T_k$, and the orientation of the three-dimensional object can be expressed using a single rotational axis $N_k$ and a single rotational angle $B_k$. $N_k$ is a normalized vector, which can be expressed using a formula $N_k = [n_X, n_Y, n_Z]^T$ and has a length of 1. In this case, if $R_k$ represents a rotary conversion obtainable from $N_k$ and $B_k$, an arbitrary point $X^m$ of the three-dimensional model moves to the following position depending on the above-described position/orientation parameters $T_k$, $N_k$ and $B_k$ according to the following formula (4).

$$X' = R_k X^m + T_k \quad (4)$$

It is now presumed that a detected area combination k is composed of specific areas k1 . . . , ku . . . , and k$N_k$. In this case, $N_k$ represents the total number of specific areas that constitute the detected area combination k. If the area combination k is defined as a triplet, the total number $N_k$ is 3 (i.e., $N_k$=3). The position/orientation estimation problem of the detected area combination k is the minimization problem of the function defined by the following formula (5).

$$E = \sum_{u=1}^{N_k} \|X'_{ku} - X_{ku}\|^2 \quad (5)$$

In formula (5), $X_{ku}$ represents the position of a specific area ku of the detected area combination k in the camera coordinate system. Further, when a position $X^m{}_{ku}$ of the specific area ku in the model coordinate system is converted according to formula (4), $X'_{ku}$ represents the corresponding position in a converted camera coordinate system. It is presumed that a quaternion expression q and a parallel displacement $T_k$ of the rotary conversion $R_k$ can be expressed using formulae q=($q_0$, $q_1$, $q_2$, $q_3$) and $T_k = [q_4, q_5, q_6]^T$, respectively.

In this case, a gravity center position μ of each specific area of the detected area combination k and a moved gravity center position μ' of each specific area of the detected area combination k can be obtained using the following formulae (6) and (7), respectively.

$$\mu = \frac{1}{N_k} \sum_{u=1}^{N_k} X_{ku} \quad (6)$$

$$\mu' = \frac{1}{N_k} \sum_{u=1}^{N_k} X'_{ku} \quad (7)$$

Further, the following formula (8) can be used to obtain a covariance matrix $S_k$ with respect to the gravity center position μ of each specific area of the detected area combination k and the moved gravity center position μ' of each specific area of the detected area combination k.

$$S_k = \frac{1}{N_k} \sum_{u=1}^{N_k} [(X_{ku} - \mu)(X'_{ku} - \mu')] \quad (8)$$

In this case, $A_{ij} = (S_k - S_k^T)_{ij}$ represents a circular element of the covariance matrix $S_k$, a column vector Δ can be defined using a formula $\Delta = [A_{23}, A_{32}, A_{12}]^T$. It is generally known that an eigenvector corresponding to maximum eigenvalues obtainable through eigenvalue analysis on a symmetric matrix Q ($S_k$) that can be expressed using the following formula (9) reflecting the above-described element becomes an optimum solution of an element string ($q_0$, $q_1$, $q_2$, $q_3$) of the quaternion expression q of the rotary conversion R.

$$Q(S_k) = \begin{pmatrix} tr(S_k) & \Delta^T \\ \Delta & S_k + S_k^T - tr(S_k) I_{3\times 3} \end{pmatrix} \quad (9)$$

In formula (9), $I_{3\times 3}$ represents a 3×3 unit matrix. The quaternion number q (i.e., the quaternion expression) of the rotary conversion R has a predetermined relationship with the single rotational axis $N_k$ and the single rotational angle $B_k$, as defined by the following formula (10). Therefore, it is feasible to obtain numerical values of $N_k$ and $B_k$.

$$\begin{cases} q_0 = \cos\left(\frac{B_k}{2}\right) \\ q_1 = n_k^X \sin\left(\frac{B_k}{2}\right) \\ q_2 = n_k^Y \sin\left(\frac{B_k}{2}\right) \\ q_3 = n_k^Z \sin\left(\frac{B_k}{2}\right) \end{cases} \quad (10)$$

Further, the following formula (11) can be used to obtain an optimum solution of the parallel displacement vector $T_k$ that represents the position of the three-dimensional object in the detected area combination k.

$$T_k = \mu - R_k \mu^m \quad (11)$$

Further, $\mu^m$ represents the gravity center of a specific area that constitutes the detected area combination k in the model coordinate system and can be obtained using the following formula (12).

$$\mu^m = \frac{1}{N_k} \sum_{u=1}^{N_k} X_{ku}^m \quad (12)$$

In step S1050 (i.e., the voting process), the computer A200 performs probability voting in a voting space with respect to the position and orientation for each detected area combination estimated in step S1040. There are various voting methods. An example voting method includes dividing the voting space relating to the position parameter X and the orientation parameter (N, B) into a plurality of bins at predetermined intervals, and voting to bins included in the position parameter $X_k$ and the orientation parameters $N_k$ and $B_k$ obtained in the area combination position/orientation estimation process in step S1040.

Alternatively, the probability voting approximated by Gaussian with the position parameter $X_k$ and the orientation parameters $N_k$ and $B_k$ positioned at the center thereof can be applied to the parameter space relating to the position parameter X and the orientation parameters N and B.

The computer A200 obtains the number of votes for the bins of the position parameter X and the orientation parameter (N, B) or a cumulative probability of a probability voting value by each detected area combination. The computer A200 obtains a position/orientation cumulative voting value P(X, N, B) of the detected area combination with respect to the position parameter X and the orientation parameter (N, B).

It is desired that the voting from each detected area combination is weighted by a detection weight that can be obtained in the specific area detection process performed in step S1020. For example, if detection weights $w_{k1}, \ldots, w_{kn}$ are obtained for specific areas $k1, \ldots, kn$ that constitute the detected area combination k, the computer A200 can calculate a value $\eta (= w_{k1} \times \ldots \times w_{kn})$ and multiply the calculated value $\eta$ with the voting value to the bin.

Finally, in step S1060 (i.e., the target object position/orientation estimation process), the computer A200 calculates estimation values with respect to the position and orientation of the three-dimensional object based on the position/orientation cumulative probability P(X, N, B) that represents a summed-up result for each detected area combination.

More specifically, the computer A200 obtains a position (X) and an orientation (N, B) that maximize the position/orientation cumulative probability P(X, N, B). If the probability P(X, N, B) value is equal to or greater than a threshold value Θ in this case, the computer A200 recognizes the position (X) and the orientation (N, B) as an estimated position and an estimated orientation of the three-dimensional object.

The threshold value Θ is a lower limit value having been set beforehand for the position/orientation cumulative probability P (X, N, B). When the threshold value Θ is a larger value, the number of required area combination votes increases. When the threshold value Θ is a smaller value, the probability of generating detection errors increases. In the present exemplary embodiment, it is desired that the threshold value Θ is equal to a fixed value (e.g., Θ=0.2). Alternatively, it is useful to adjust the threshold value Θ in step S2340 (i.e., an evaluation process).

If the calculation cost is taken into consideration, it is difficult to detect a maximum point by calculating the position/orientation cumulative probability P (X, N, B) in the entire position/orientation search space. Therefore, in the voting process to be performed in step S1050, the computer A200 can obtain the position/orientation cumulative probability P (X, N, B) only for the estimated position and the estimated orientation of each detected area combination.

In this case, first, in the target object position/orientation estimation process to be performed in step S1060, the computer A200 checks if the position/orientation cumulative probability P ($X_k, N_k, B_k$) of a point is equal to or greater than the threshold value Θ in the estimated position and the estimated orientation of each detected area combination k. If the probability P is equal to or greater than the threshold value Θ, the computer A200 leaves the point as a position/orientation estimation value candidate.

Then, the computer A200 clusters the estimated positions (i.e., position/orientation estimation value candidates) in a concentrated manner to summarize detected area combinations voting to the near position/orientation. The computer A200 calculates mean position/orientation values of the detected area combinations summarized in the same cluster, which are weighted by the position/orientation cumulative probability P ($X_k, N_k, B_k$), and outputs the calculated mean values as the estimated position and the estimated orientation.

As described above, in the recognition processing, the computer A200 estimates the position and orientation of a three-dimensional object by voting. When the computer A200 performs the above-described processing, it is required that the computer A200 can effectively define specific areas and area combinations to be used in the estimation of the position and orientation.

The present exemplary embodiment can provide a specific area selection method capable of successively selecting effective specific areas and effective area combinations.

Figure 5:
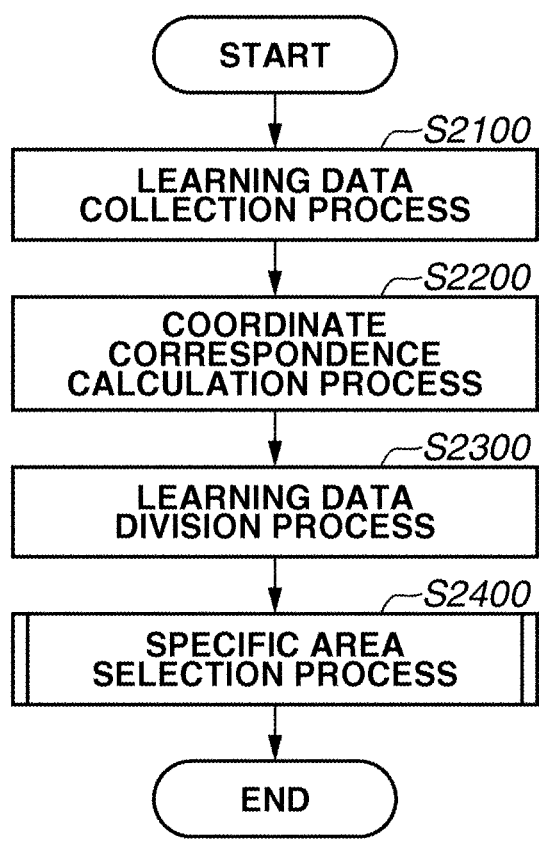
FIG. 5 is a flowchart illustrating learning processing according to the first exemplary embodiment of the present invention.

Hereinafter, the learning processing is described in detail below. FIG. 5 is a flowchart illustrating an example procedure of the learning processing. In step S2100 (i.e., a learning data collection process), the coordinate correspondence calculation unit 400 acquires, as learning data, image data $I^v$ representing three-dimensional object information obtained from a plurality of viewpoints v (v=1, . . . , V) relating to the three-dimensional object as well as distance map data $Xmap^v$, $Ymap^v$, and $Zmap^v$ in the camera coordinate system.

It is desired that the settings relating to the camera and the distance measurement method in acquiring the above-described three-dimensional object information is similar to the settings in the specific area detection processing, although these settings are not always required to be the same. In some cases, it is useful to employ the computer graphics technique to generate three-dimensional object information at various viewpoints, based on a three-dimensional model, and use the generated three-dimensional object information as the image data $I^v$ and the map data $Xmap^v$, $Ymap^v$, and $Zmap^v$ in the camera coordinate system.

In step S2200 (i.e., a coordinate correspondence calculation process), the coordinate correspondence calculation unit 400 acquires a three-dimensional model from the three-dimensional model storage unit 600 and correlates an image coordinate system of the image data $I^v$ obtained from each viewpoint with the camera coordinate system based on the acquired three-dimensional model.

First, the coordinate correspondence calculation unit 400 calculates the position and orientation of a three-dimensional object of the image data $I^v$ in the camera coordinate system, manually or through matching processing using conventionally known tracking tools. When the position and orientation of a three-dimensional object of the image data are obtainable in the camera coordinate system, a three-dimensional object area can be obtained through a perspective projection into the image coordinate system.

Figure 6A:
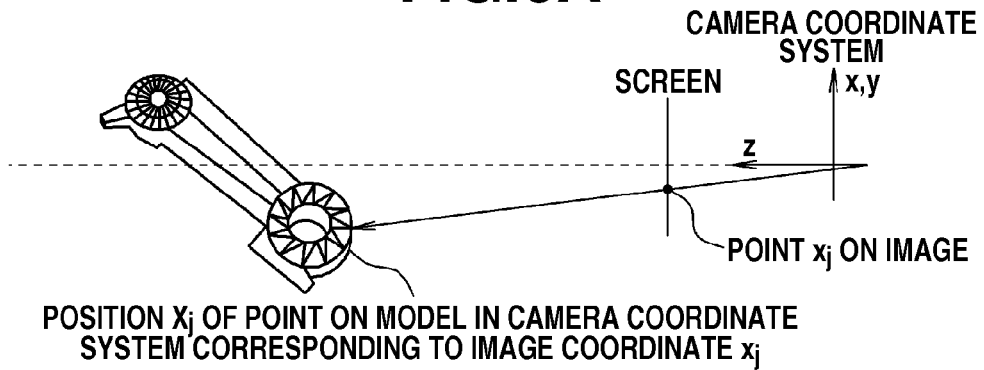
FIGS. 6A to 6C illustrate the learning processing according to the first exemplary embodiment of the present invention.

Thus, as illustrated in FIG. 6A, it is feasible to obtain a point $X_j$ of a three-dimensional model in the camera coordinate system that corresponds to a point $x_j$ of the three-dimensional object in each image coordinate system. Through the above-described processing, the coordinate correspondence calculation unit 400 can thoroughly calculate a corresponding relationship between a point in the image coordinate system and a point in the camera coordinate system in the three-dimensional object area of each image data $I^v$, and transmits the calculated information to the learning apparatus 200.

Further, the coordinate correspondence calculation unit 400 transmits a rotational axis unit vector $n^v$ and a rotational angle $\beta^v$, (i.e., a single turn expression of the orientation parameters of the three-dimensional object, which can be obtained through the above-described matching processing) together with a parallel displacement vector $X_c^v$ (i.e., the position of the three-dimensional object) to the learning apparatus 200.

The coordinate correspondence calculation unit 400 can summarize the above-described information as learning data $S=\{I^v, Xmap^v, Ymap^v, Zmap^v, n^v, \beta^v, X_c^v\}$ for all viewpoints $v$ ($v=1, \ldots, V$). If the learning data can be artificially generated based on a three-dimensional model and the position/orientation of a three-dimensional object at each viewpoint is known beforehand, the above-described matching processing can be omitted.

In step S2300 (i.e., a learning data division process), the learning apparatus 200 divides the learning data obtained from the plurality of viewpoints $v$ ($v=1, \ldots, V$) through the learning image collection process (see step S2100) and the coordinate point correspondence calculation process (see step S2200) into specific area learning data and evaluation data.

First, the learning apparatus 200 reallocates the viewpoint index $v$ as $v_L=1, \ldots, V_L$ and $v_w=1, \ldots, V_w$. Then, the learning apparatus 200 divides the image data $I^v$, the camera coordinate system map data $Xmap^v$, $Ymap^v$ and $Zmap^v$, and the orientation parameters $n^v$ and $\beta^v$ and the position parameter $X_c^v$ of a three-dimensional object in each data into two groups according to the reallocated viewpoint index.

More specifically, through the division processing, the learning apparatus 200 can acquire specific area learning data $S_L=\{I^{v_L}, Xmap^{v_L}, Ymap^{v_L}, Zmap^{v_L}, n^{v_L}, \beta_{v_L}, \text{and } X_c^{v_L}\}$ and evaluation data $S_W=\{I^{v_W}, Xmap^{v_W}, Ymap^{v_W}, Zmap^{v_W}, n^{v_W}, \beta^{v_W}, \text{and } X_c^{v_W}\}$ In this case, the data included in the specific area learning data $S_L$ may be partly identical to the data included in the evaluation data $S_W$.

Figure 6B:
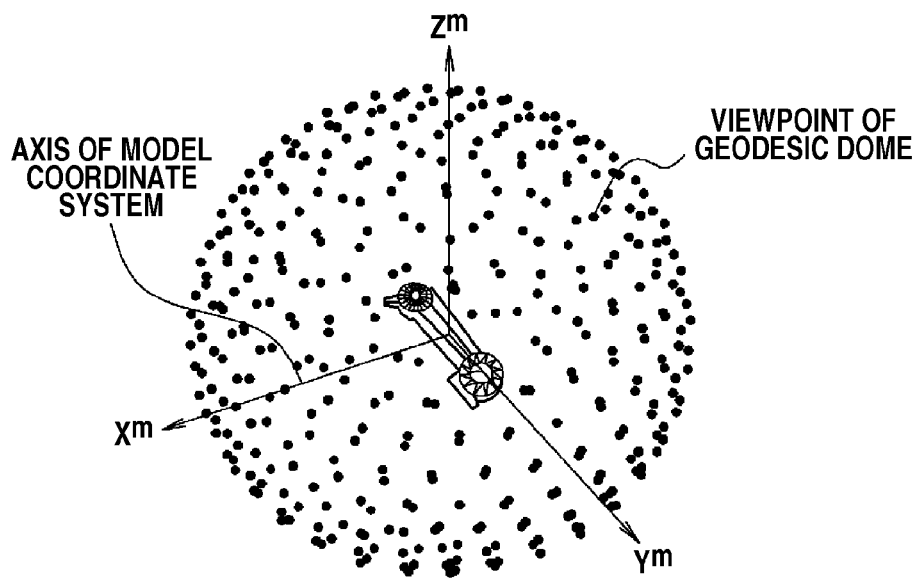

To obtain desirable orientation estimation performance based on a learning result without causing any bias that may occur depending on the viewpoint, it is desired that the distribution of respective viewpoints can be uniformly approximated as a geodesic dome (see FIG. 6B) in each of the specific area learning data $S_L$ and the evaluation data $S_W$.

Usage of the geodesic dome is a conventionally known method capable of realizing a uniform discrete representation of a sphere by recursively dividing a triangular surface element of a regular polyhedron into triangles having the same area.

Figure 6C:
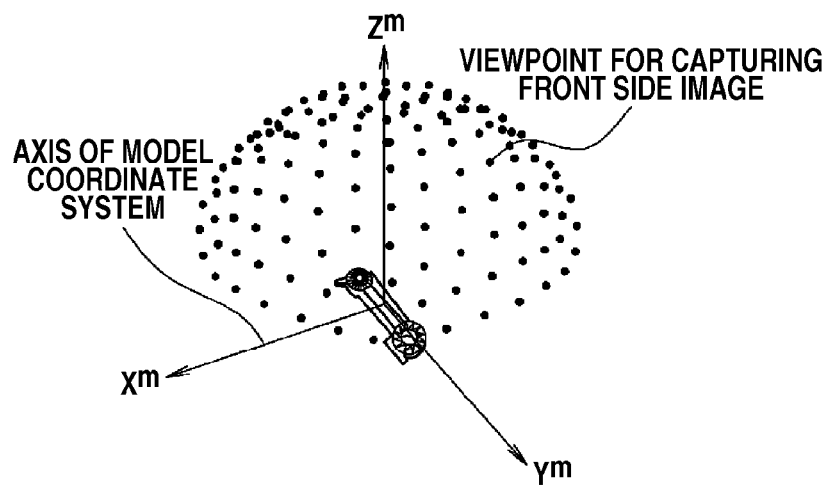

However, if a pre-distribution relating to the orientation is known beforehand according to the layout condition of a three-dimensional object, it is useful to prepare learning data at a viewpoint density that corresponds to the distribution. For example, if the detection target is a three-dimensional object to be supplied with its front face positioned constantly at the leading side thereof, it is desired to collect and use only the learning data relating to the front side as illustrated in FIG. 6C. An example specific area selection method using the above-described learning data can be realized by the learning apparatus 200 as described below in step S2400 (i.e., a specific area selection process).

FIG. 7 is a flowchart illustrating detailed processing of the specific area selection process to be performed in step S2400. First, in step S2410 (i.e., a specific area initial selection process), the learning apparatus 200 arbitrarily selects at least one viewpoint $v$ from the learning data S. More specifically, the learning apparatus 200 randomly selects $N_0$ points that can cooperatively constitute an area combination from a three-dimensional object area in the image coordinate system of the image data $I^v$, as initial specific areas.

For example, if the area combination is a triplet (i.e., a combination of three points), the number $N_0$ of randomly selected points is equal to or greater than 3 (i.e., $N_0 \geq 3$). In the most simple case, the number $N_0$ can be set to be equal to 3 (i.e., $N_0=3$). However, as described above, the area combination is not limited to the triplet (i.e., the combination of three points). Therefore, the minimum setting value of the number $N_0$ is variable depending on the type of the area combination.

Figure 9:
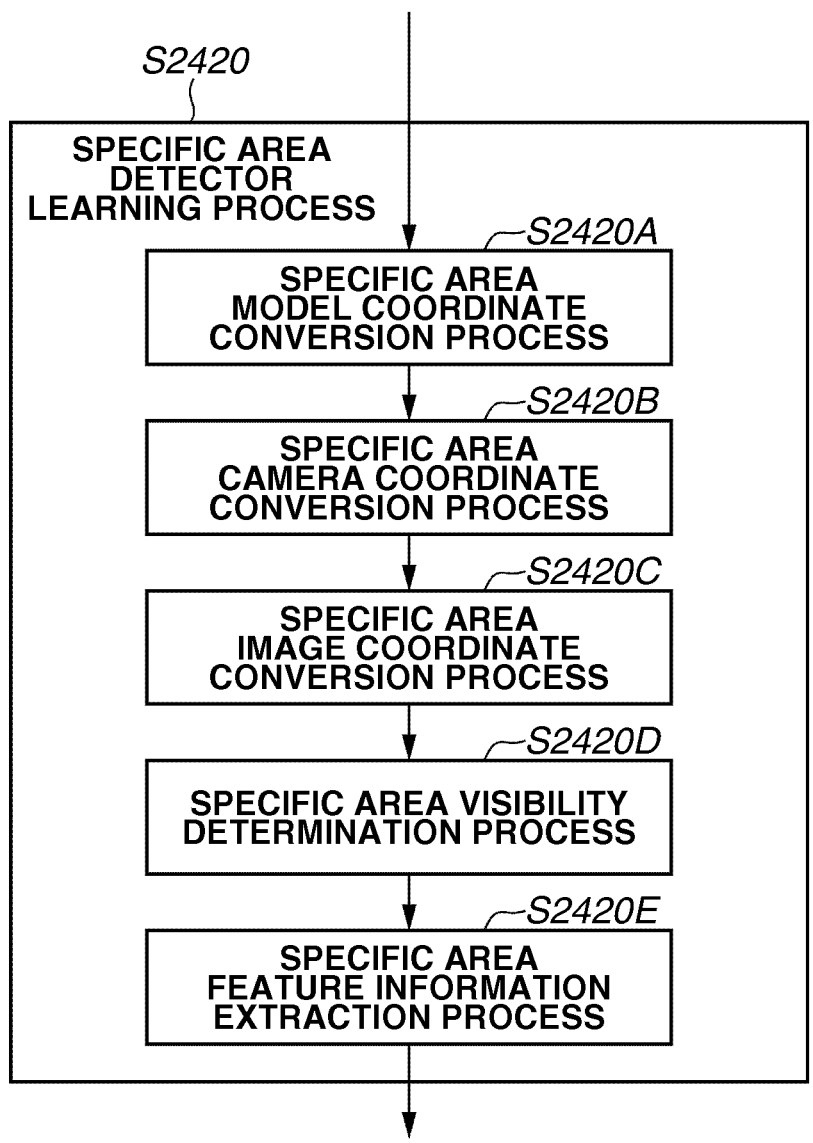
FIG. 9 is a flowchart illustrating detailed processing of a specific area detector learning process (step S2420) according to the first exemplary embodiment of the present invention.

Next, in step S2420 (a specific area detector learning process), the learning apparatus 200 learns a specific area detector that corresponds to the $N_0$ selected specific areas. FIG. 9 is a flowchart illustrating details of the specific area detector learning process to be performed in step S2420. First, in step S2420A (i.e., a specific area model coordinate conversion process), the learning apparatus 200 calculates coordinate values of a specific area "a" in the model coordinate system.

Figure 8A:
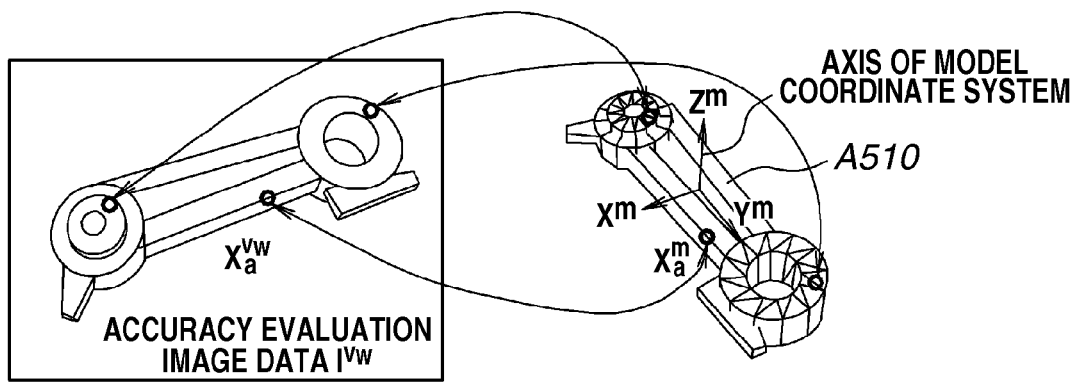
FIGS. 8A and 8B illustrate a method for calculating the position of each specific area in a model coordinate system and a method for selecting specific areas to be added.

In the present exemplary embodiment, $x_a^v=[x_a, y_a]^T$ represents the position of the specific area "a" in the image coordinate system when the image data $I^v$ is obtained from the viewpoint $v$. The learning apparatus 200 can obtain the position in the camera coordinate system using a formula $X_a^v=[Xmap^v(x_a^v), Ymap^v(x_a^v), Zmap^v(x_a^v)]$. On the other hand, the learning apparatus 200 can use the following formula (13) to calculate a position $X_a^m$ of the specific area "a" in the model coordinate system based on the orientation parameters $n^v$ and $\beta^v$ and the position parameter $X_c^v$, as illustrated in FIG. 8A.

$$X_a^m = R(n^v, \beta^v)^{-1}(X_a^v - X_c^v) \quad (13)$$

In formula (13), $R(n^v, \beta^v)$ represents a rotational transformation matrix based on a single rotational axis $n^v$ and a single rotational angle $\beta^v$. If the position $X_a^m$ of the specific area "a" in the model coordinate system can be obtained in the above-described manner, then in step S2420B (i.e., a specific area camera coordinate conversion process), the learning apparatus 200 calculates a position $X_a^{v_L}$ of the specific area learning data $S_L$, in the camera coordinate system, at each viewpoint $v_L$, according to the following formula (14).

$$X_a^{v_L} = R(n^{v_L}, \beta^{v_L})X_a^m + X_c^{v_L} \quad (14)$$

In step S2420C (i.e., a specific area image coordinate conversion process), the learning apparatus 200 converts the position $X_a^{v_L}$ in the camera coordinate system into a corresponding position $x_a^{v_L}$ in the image coordinate system, based on the camera parameters used in the learning data acquisition processing, according to the following formula (15).

$$x_a^{v_L} = \begin{bmatrix} x_a^{v_L} \\ y_a^{v_L} \end{bmatrix} = \frac{f}{Z_a^{v_L}\delta}\begin{bmatrix} x_a^{v_L} \\ y_a^{v_L} \end{bmatrix} \quad (15)$$

The above-described formula (15) includes the above-described camera parameters δ and f, in which δ represents the pixel size of the camera and f represents the focal length of the camera.

In step S2420D (i.e., a specific area visibility determination process), the learning apparatus 200 compares the values of $Z_a^{vL}$ and $Zmap^{vL}(x_a^{vL})$. If a relationship $Z_a^{vL} > Zmap^{vL}(x_a^{vL})$ is satisfied, the learning apparatus 200 determines that the specific area "a" is not visible from the viewpoint $v_L$. In this manner, the learning apparatus 200 determines whether the specific area is visible from all viewpoints of the specific area learning data $S_L$.

In step S2420E (i.e., a specific area feature information extraction process), the learning apparatus 200 clips a partial image including the image coordinate system position $x_a^{vL}$ positioned at the center thereof, from the viewpoint $v_L$ (i.e., from the visible angle), using a method similar to that employed for the specific area detection processing. Further, the learning apparatus 200 extracts feature information as data to be used to learn the specific area detector.

If the feature information is rotationally variant information, the learning apparatus 200 can rotate the clipped partial image in the plane to obtain in-plane rotational feature information and add the obtained information to the data.

The learning apparatus 200 generates data to be required to learn specific area detectors through the above-described processing for all of the $N_0$ selected specific areas. The learning apparatus 200 generates a specific area detector for each specific area based on the generated data. The specific area detector is, for example, a discriminator based on a conventionally known technique (e.g., Support Vector Machine (SVM) or Randomized Tree) or any other exiting method.

Further, the above-described specific area detectors can be configured as a multiclass classifier that can classify each area into a corresponding class in the learning processing. Further, as another specific area detector, for example, a conventionally known One-Class SVM is employable to learn a specific area detector with respect to each specific area. In this case, it is feasible to generate a plurality of specific area detectors corresponding to the total number of specific areas.

If the specific area detectors are obtained in the specific area detector learning process in step S2420, then in step S2430 (i.e., an area combination generation process), the learning apparatus 200 generates combinations of specific areas as area combination candidates. If each area combination is a triplet (i.e., a combination of three areas), a total of $_{N0}C_3$ area combination candidates are present when the total number of selected areas is $N_0$.

However, if the above-described visibility determination result is available, it is useful to exclude any combination of specific areas that are not simultaneously visible beforehand from the area combination candidates. Further, it is unnecessary to generate all of combinations composed of visible specific areas. It is desired to reduce the total number of area combination candidates, for example, by excluding any combination of specific areas arrayed along the same line, or by applying Delauney triangulation to eliminate duplication of edge lines.

In step S2440 (i.e., an evaluation process), the learning apparatus 200 performs estimation with respect to the position and orientation according to the recognition processing previously described in steps S1010 to S1060, using the generated specific area detectors and the area combinations, when the data corresponding to all viewpoints of the evaluation data $S_W$ are used as input data. The learning apparatus 200 compares results of the recognition processing that can be obtained by variously changing the above-described voting threshold value Θ.

Any evaluation value is usable to evaluate the recognition processing result if the value can realize simultaneous expression of correct recognition result, non-detection, and erroneous recognition. In the present exemplary embodiment, if an obtained position/orientation estimation result is within a predetermined allowable error range, the learning apparatus 200 determines that a correct recognition result can be obtained.

If the obtained position/orientation estimation result is not within the predetermined allowable error range, the estimation result is referred to as "erroneous recognition." Further, if no position/orientation estimation result is obtained, the estimation result is referred to as "non-detection."

For example, the following F value can be used as the evaluation value. The F value can be obtained as a harmonic mean of precision and recall. In this case, the precision is a correct answer rate of the obtained answer, which can be defined using an expression (total number of correct answers)/(total number of correct answers+number of erroneous recognitions). The recall is a correct answer rate of all input data, which can be defined using an expression (total number of correct answers)/(total number of input data). The F value is a value representing the trade-off between the above-described rates and can be expressed using an expression 2/(1/precision+1/recall).

The learning apparatus 200 employs a voting threshold value Θ that can obtain the best result as a comparison result of the evaluation values. In step S2470, the learning apparatus 200 performs repetitive determination of the processing loop with reference to the obtained evaluation result. If it is determined that correct recognition results are obtained at all viewpoints $v_w$ (YES in step S2470), the learning apparatus 200 stores specific area detector parameters together with information relating to the specific area and the area combination in the learning parameter storage unit 700, and completes the learning processing. On the other hand, if it is determined that there is a viewpoint at which no correct recognition result can be obtained (NO in step S2470), the processing proceeds to step S2450 (i.e., a specific area addition process).

In step S2450 (i.e., the specific area addition process), the learning apparatus 200 adds new specific area candidates for a viewpoint at which no position/orientation estimation result has been obtained within the predetermined allowable error range in the evaluation process performed in step S2440, more specifically, for a viewpoint at which the non-detection has occurred.

First, the learning apparatus 200 arbitrarily selects a viewpoint $v_{FN}$ from the viewpoints of the evaluation data $S_W$ at which the non-detection has occurred.

The learning apparatus 200 causes the specific area detector of the present specific area to scan the evaluation data $I^{vFN}$, $Xmap^{vFN}$, $Ymap^{vFN}$, and $Zmap^{vFN}$ corresponding to the viewpoint $v_{FN}$. With reference to a scanning output, the learning apparatus 200 selects and adds new specific areas from an image area of the image data $I^{vFN}$ to which the specific area detector did not respond. The position of the added specific area can be arbitrarily selected from an image area that has not been detected by the specific area detector in a component area that can be calculated based on a three-dimensional model.

Figure 8B:
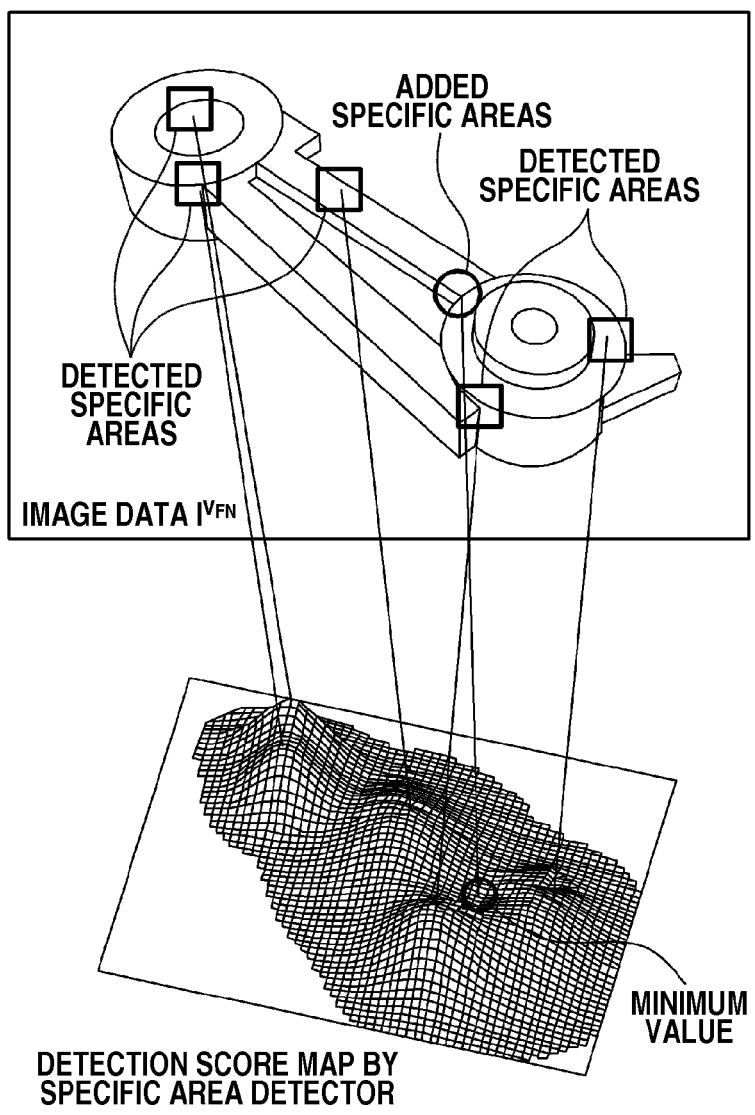

For example, as illustrated in FIG. 8B, the learning apparatus 200 can obtain a detection score map by plotting a detection value on the image coordinate system if the detection value is obtained by each specific area detector and select a position where the detection score is minimized in the component area. The method for selecting the specific areas to be added is not limited to the above-described method using the detection score. For example, it is useful to select specific areas to be added randomly from the component area. Further, a plurality of areas can be simultaneously added.

Next, in step S2460 (i.e., a specific area detector additional learning process), the learning apparatus 200 learns the specific area detector including the added specific area (s). If $x_{new}^{vFN}$ represents the position of a specific area added in the specific area addition process (see step S2450) in the image coordinate system, a corresponding position in the camera coordinate system can be obtained as $X_{new}^{vFN}=[X_{new}^{vFN}, Y_{new}^{vFN}, Z_{new}^{vFN}]=[Xmap^{vFN}(x_{new}^{vFN}), Ymap^{vFN}(x_{new}^{vFN}), Zmap^{vFN}(x_{new}^{vFN})]$.

On the other hand, the learning apparatus 200 can use the following formula (16) to calculate a position $X_{new}^{m}$ of the added specific area in the model coordinate system with reference to position/orientation parameters $n^{vFN}$, $\beta^{vFN}$, and $X_{c}^{vFN}$.

$$X_{new}^{m}=R(n^{v}_{FN},\beta^{v}_{FN})^{-1}(X_{new}^{v}{}_{FN}-X_{c}^{v}{}_{FN}) \qquad (16)$$

In formula (16), $R(n^{vFN}, \beta^{vFN})$ represents a rotational transformation matrix derived from a single rotational axis $n^{vFN}$ and a single rotational angle $\beta^{vFN}$. If the position $X_{new}^{m}$ of the specific area in the model coordinate system can be obtained in the above-described manner, the learning apparatus 200 calculates a camera coordinate system position $X_{new}^{vL}$ of specific area detector learning data $S_L$, at each viewpoint $v_L$, according to the following formula (17).

$$X_{new}^{v}{}_{L}=R(n^{v}{}_{L},\beta^{v}{}_{L})X_{new}^{m}+X_{c}^{v}{}_{L} \qquad (17)$$

The learning apparatus 200 further converts the camera coordinate system position $X_{new}^{vL}$ into an image coordinate system position $x_{new}^{vL}$, based on the camera parameters used in the acquisition of the learning data, according to the following formula (18).

$$x_{new}^{vL}=\begin{bmatrix}x_{new}^{vL}\\y_{new}^{vL}\end{bmatrix}=\frac{f}{Z_{new}^{vL}\delta}\begin{bmatrix}X_{new}^{vL}\\Y_{new}^{vL}\end{bmatrix} \qquad (18)$$

The formula (18) includes the above-described camera parameters δ and f, in which δ represents the pixel size of the camera and f represents the focal length of the camera. The learning apparatus 200 compares the values of $Z_{new}^{vL}$ and $Zmap^{vL}(x_{new}^{vL})$. If a relationship $Z_{new}^{vL}>Zmap^{vL}(x_{new}^{vL})$ is satisfied, the learning apparatus 200 determines that the specific area is not visible from the viewpoint $v_L$.

In this manner, the learning apparatus 200 determines whether the specific area is visible from all viewpoints of the specific area learning data $S_L$. The learning apparatus 200 clips a partial image including the image coordinate system position $x_a^{vL}$ positioned at the center thereof, from the viewpoint $v_L$ (i.e., from the visible angle), using a method similar to that employed for the detection processing.

Then, the learning apparatus 200 extracts feature information and adds the extracted feature information to the data to be used to learn the specific area detector. The learning apparatus 200 learns the specific area detector that relates to each specific area in addition to the added data and generates specific area detectors.

If the learning apparatus 200 has completed the additional learning of the specific area detector in step S2460 (i.e., the specific area detector additional learning process), the processing returns to step S2430 (i.e., the area combination generation process), in which the learning apparatus 200 generates area combination candidates and performs the above-described evaluation again.

Through the above-described processing, the specific area selection system according to the present exemplary embodiment can adequately select specific areas and area combinations composed of the specific areas that are required to perform recognition processing. Especially, the specific area selection system according to the present exemplary embodiment can effectively select specific areas and area combinations required to estimate the position and orientation of a target object from a plurality of viewpoints in such a way as to optimize the position/orientation estimation performed at all viewpoints.

Next, an information processing apparatus and an information processing method according to a second exemplary embodiment of the present invention are described below. A specific area selection method according to the present exemplary embodiment can reduce the number of area combinations in such a way as to optimize the detection result in selecting the specific areas and the area combinations required to perform the recognition processing as described in the first exemplary embodiment.

The learning apparatus 200 generates learning data through a learning data collection process, a coordinate correspondence calculation process, and a learning data division process that are similar to the processing in steps S2100, S2200, and S2300 of FIG. 5 described in the first exemplary embodiment of the present invention.

More specifically, in the present exemplary embodiment, the learning apparatus 200 can acquire target object information obtainable from a plurality of viewpoints and calculate a corresponding relationship between the model coordinate system and the image coordinate system to generate learning data S, and can generate specific area learning data $S_L$ and evaluation data $S_W$.

FIG. 10 is a flowchart illustrating detailed processing of a specific area selection process according to the second exemplary embodiment. First, in step S2411 (i.e., a specific area initial selection process), the learning apparatus 200 selects $N_0$ specific areas that can cooperatively constitute an area combination from a portion that becomes an object area in the image coordinate system of the image data $I^v$, with respect to an arbitrary viewpoint v in the learning data S.

Next, the learning apparatus 200 determines whether the selected specific areas are visible at another viewpoint to select at least $N_0$ specific areas including the visible specific areas, and adds the selected specific areas as specific areas. The learning apparatus 200 performs the above-described processing for a plurality of viewpoints to obtain initial specific areas.

In steps S2421 and S2431, the learning apparatus 200 performs processing similar to the specific area detector learning process (see step S2420) and the area combination generation process (see step S2430) described in the first exemplary embodiment. Through the processing in steps S2421 and S2431, the learning apparatus 200 generates specific area detectors and further generates candidate area combinations. The learning apparatus 200 allocates an index t (=1, . . . , $N_t$) to each area combination generated in step S2431. In this case, $N_t$ is the total number of area combinations generated in the area combination generation process (step S2431).

In step S2441 (i.e., an evaluation process), the learning apparatus 200 performs recognition processing that is similar to the processing in steps S1010 to S1060 described in the first exemplary embodiment, using the generated specific area detectors and the area combinations, when the data corresponding to all viewpoints of the evaluation data $S_W$ are used as input data. Then, the learning apparatus 200 calculates an evaluation value.

Any evaluation value is usable if the value can realize simultaneous expression of correct recognition result and erroneous recognition. For example, the F value described in the first exemplary embodiment can be used as an evaluation value. The learning apparatus 200 evaluates results of the recognition processing that can be obtained by variously changing the above-described voting threshold value $\Theta$ and employs a voting threshold value $\Theta$ that can obtain the best result. $E_0$ represents the evaluation value obtained in this case.

Next, the learning apparatus 200 performs evaluation similarly using the data corresponding to all viewpoints of the evaluation data $S_W$ in a state where one area combination is excluded from the area combinations t (t=1, ..., $N_t$). The learning apparatus 200 performs the above-described processing for all area combinations t (t=1, ..., $N_t$) and obtains an evaluation value $E_t$.

In step S2451, the learning apparatus 200 performs repetitive determination of the processing loop with reference to the obtained evaluation results $E_0$ and $E_t$ (t=1 ... $N_t$). If it is determined that all of the evaluation values $E_t$ are worse than the evaluation value $E_0$ (e.g., when all of the evaluation values $E_t$ is smaller than the evaluation value $E_0$ if the evaluation value is the F value) (YES in step S2451), the learning apparatus 200 stores specific area detector parameters together with information relating to the specific area and the area combination in the learning parameter storage unit 700, and completes the specific area selection routine.

On the other hand, if it is determined that at least one of the evaluation values $E_t$ is not worse than the evaluation value $E_0$ (NO in step S2451), the processing proceeds to a specific area deletion process (step S2471).

In the specific area deletion process (step S2471), the learning apparatus 200 deletes unnecessary area combinations from the area combinations with reference to the evaluation value obtained in the evaluation process (step S2441). The learning apparatus 200 selects an arbitrary area combination from the group of the area combinations t, which corresponds to the evaluation value $E_t$ better than the evaluation value $E_0$.

The learning apparatus 200 deletes the selected area combination from an area combination list. When the unnecessary area combination is deleted, the discrimination performance in the recognition processing can be improved from $E_0$ to $E_t$ in terms of the above-described evaluation value. In other words, the learning apparatus 200 can remove an area combination that has an adverse influence on the discrimination result.

Further, the number of area combinations to be deleted in step S2471 is not limited to only one. It is also desired to delete a plurality of area combinations simultaneously. For example, if there are two or more area combinations whose evaluation value $E_t$ is better than the evaluation value $E_0$, the learning apparatus 200 can delete only one area combination that corresponds to the best evaluation value.

Alternatively, it is useful to sort the evaluation value $E_t$ to delete a predetermined number of area combinations in descending order of magnitude. Further, the learning apparatus 200 can delete all of the areas t corresponding to the evaluation value $E_t$ better than the evaluation value $E_0$.

Alternatively, when the calculation load is taken into consideration, the learning apparatus 200 can delete all of unnecessary area combinations simultaneously when many specific areas are present and can delete unnecessary area combinations one after another if the number of remaining specific areas is small.

After the learning apparatus 200 has completed the deletion of unnecessary area combination (s), if a specific area that constitutes the deleted area combination is not included in a constitution area of a remaining area combination, the learning apparatus 200 deletes the specific area from a specific area list. The learning apparatus 200 reallocates the index for the remaining specific areas and the remaining area combinations and updates the area combination number $N_t$. Further, the learning apparatus 200 completes the specific area deletion process (step S2471).

If the learning apparatus 200 has completed the deletion of unnecessary area combination/specific area in the specific area deletion process (step S2471), the processing returns to the evaluation process (step S2441), in which the learning apparatus 200 performs the above-described evaluation again.

Through the above-described processing, the specific area selection system according to the present exemplary embodiment can effectively select specific areas and area combinations composed of the selected specific areas that are required in the recognition processing.

Especially, the specific area selection system according to the present exemplary embodiment can effectively select specific areas and area combinations required to estimate the position and orientation of a target object from a plurality of viewpoints in such a way as to optimize the position/orientation estimation performed at all viewpoints.

Next, an information processing apparatus and an information processing method according to a third exemplary embodiment of the present invention are described below. According to the specific areas/area combinations selection method described in the first exemplary embodiment, the learning apparatus 200 adds specific areas for a viewpoint at which the non-detection has occurred in such a way as to eliminate any bias in non-detection generation rate caused by the difference in viewpoint.

Further, according to the specific areas/area combinations selection method described in the second exemplary embodiment, the learning apparatus 200 deletes unnecessary area combination (a) from a state where a great amount of area combinations are prepared, in such a way as to improve the entire evaluation value.

When the above-described processes for adding and deleting specific areas and area combinations are combined, an effective selection of the specific areas and the area combinations can be realized. A specific area selection method according to the third exemplary embodiment includes addition of specific areas for a viewpoint at which the non-detection has occurred and deletion of unnecessary area combination(s) for a viewpoint at which the error detection has occurred.

The learning apparatus 200 generates learning data through a learning data collection process, a coordinate correspondence calculation process, and a learning data division process that are similar to the processing in steps S2100, S2200, and S2300 of FIG. 5 described in the first exemplary embodiment of the present invention.

More specifically, in the present exemplary embodiment, the learning apparatus 200 can acquire target object information obtainable from a plurality of viewpoints and calculate a corresponding relationship between a three-dimensional model and the image coordinate system to generate learning data S, and can generate specific area learning data $S_L$ and evaluation data $S_W$.

FIG. 11 is a flowchart illustrating detailed processing of a specific area selection process according to the third exemplary embodiment. More specifically, in steps S2412, S2422, and S2432, the learning apparatus 200 performs processing similar to the specific area initial selection process (see step S2410), the specific area detector learning process (see step S2420) and the area combination generation process (see step S2430) described in the first exemplary embodiment. More specifically, the learning apparatus 200 performs specific area initial setting processing, generation processing by learning of each specific area detector, and area combination generation processing.

In step S2442 (i.e., an evaluation process), the learning apparatus 200 performs recognition processing at all viewpoints of the evaluation data $S_W$ and extracts a viewpoint at which non-detection or erroneous recognition of a target object occurs.

In step S2402, the learning apparatus 200 determines whether the recognition processing has been correctly performed at all viewpoints. If it is determined that there is a viewpoint at which the non-detection of the target object occurs (NO in step S2402), the processing proceeds to step S2452 (i.e., a specific area addition process).

If it is determined that there is not any viewpoint at which the non-detection of the target object occurs and there is not any viewpoint at which the erroneous recognition occurs (YES in step S2402), the learning apparatus 200 stores specific area detector parameters together with information relating to the specific area and the area combination in the learning parameter storage unit 700, and then completes the learning processing.

Further, if it is determined that there is a viewpoint at which the erroneous recognition occurs although there is not any viewpoint at which the non-detection of the target object occurs (NO in step S2482), the processing proceeds to step S2472 (i.e., a specific area deletion process).

In steps S2452 and S2462, the learning apparatus 200 performs processing similar to the specific area addition process (see step S2450) and the specific area detector additional learning process (see step S2460) described in the first exemplary embodiment. More specifically, the learning apparatus 200 adds specific areas for a viewpoint at which the non-detection occurs in the evaluation data $S_W$, adds learning data relating to the added specific areas, and generates a specific area detector including added specific areas.

If the learning apparatus 200 has completed the specific area detector additional learning process (step S2462), then in step S2482, the learning apparatus 200 determines whether there is any viewpoint at which the erroneous recognition has occurred in the evaluation result of the evaluation process (step S2442). If it is determined that there is not any viewpoint at which the erroneous recognition has occurred (YES in S2482), then in step S2492, the learning apparatus 200 further determines whether there is any added specific area.

If it is determined that an added specific area is present (YES in step S2492), the processing returns to step S2432. On the other hand, if there is not any added specific area (NO in step S2492), the learning apparatus 200 completes the processing of the specific area selection process. Further, if it is determined that there is a viewpoint at which the erroneous recognition has occurred (NO in step S2482), the processing proceeds to step S2472 (i.e., the specific area deletion process).

In the specific area deletion process (step S2472), the learning apparatus 200 selects an arbitrary viewpoint $v_{FP}$ from the viewpoints at which the erroneous recognition has occurred in the evaluation process (step S2442) and deletes unnecessary area combinations. Any criterion can be used to select the viewpoint $v_{FP}$. For example, the learning apparatus 200 can select a viewpoint that includes an erroneous recognition having the largest value in the voting score among the erroneous recognitions generated at all viewpoints.

The learning apparatus 200 deletes an area combination that has a higher value in the degree of contribution to erroneous recognition of position/orientation in a voting result at the viewpoint $v_{FP}$.

The learning apparatus 200 can calculate a voting contribution of each area combination in the following manner. First, the learning apparatus 200 obtains a voting probability from each detected area combination $k_{FP}$ ($k_{FP}=1, \ldots, N_{kFP}$) detected at the viewpoint $v_{FP}$, with respect to an erroneous recognition position $X_{FP}$ and an erroneous recognition orientation ($N_{FP}$, $B_{FP}$) calculated by voting, using a formula similar to formula (16) described in the first exemplary embodiment. The learning apparatus 200 can use the following formula (19) to obtain a voting probability $P(X_{FP}, N_{FP}, B_{FP}|T_{kFP}, N_{kFP}, Bk_{FP})$.

$$P(X_{FP},N_{FP},B_{FP}|T_{k_{FP}},N_{k_{FP}},B_{k_{FP}})=P(X_{FP}|T_{k_{FP}})P(N_{FP}, B_{FP}|N_{k_{FP}},B_{k_{FP}}) \quad (19)$$

In formula (19), $T_{kFP}$, $N_{kFP}$ and $B_{kFP}$ represent position/orientation parameters of the detected area combination $k_{FP}$ obtained in the recognition processing. A practical value of formula (19) can be obtained when $T_{kFP}$, $N_{kFP}$, and $B_{kFP}$ are input to formula (13) and formula (15). The learning apparatus 200 regards the voting probability $P(X_{FP}, N_{FP}, B_{FP}|T_{kFP}, N_{kFP}, Bk_{FP})$ as the voting contribution of the detected area combination $k_{FP}$. The learning apparatus 200 deletes the area combination having the largest value in the voting probability $P(X_{FP}, N_{FP}, B_{FP}|T_{kFP}, N_{kFP}, Bk_{FP})$.

If the learning apparatus 200 has completed the specific area deletion process (step S2472), the processing returns to step S2432 (i.e., the area combination generation process). When the processing of the specific area selection loop returns to the area combination generation process (step S2432), the learning apparatus 200 generates a new area combination including added specific areas. However, in this case, the learning apparatus 200 can generate only the area combination composed of newly added specific areas.

As described above, the learning apparatus 200 selects a viewpoint at which the erroneous recognition has occurred and deletes unnecessary area combinations from the area combinations detected at the selected viewpoint. However, the learning apparatus 200 can select area combinations to be deleted from the evaluation values obtained at all viewpoints as described in the second exemplary embodiment.

In this case, in step S2442 (i.e., the evaluation process), the learning apparatus 200 calculates an evaluation value relating to the data corresponding to all viewpoints of the evaluation data $S_W$ using all of the specific areas, similar to the evaluation process (see step S2441) described in the second exemplary embodiment. $E_0$ represents the evaluation value obtained in this case.

Next, the learning apparatus 200 performs evaluation similarly using the data corresponding to all viewpoints of the evaluation data $S_W$ in a state where one area combination is excluded from the area combinations t (t=1, . . . , $N_t$) and obtains an evaluation value $E_t$.

Further, in step S2472 (i.e., the specific area deletion process), the learning apparatus 200 selects an arbitrary area combination from the area combinations corresponding to the evaluation value $E_t$ better than the evaluation value $E_0$, similar to the specific area deletion process (see step S2471) described in the second exemplary embodiment. The learning apparatus 200 deletes the selected area combination from the area combination list.

After the learning apparatus 200 has completed the deletion of unnecessary area combination (s), if a specific area that constitutes the deleted area combination is not included in a constitution area of a remaining area combination, the learning apparatus 200 deletes the specific area from the specific area list.

Further, as an example method for deleting unnecessary area combination (s), the learning apparatus 200 can delete area combinations having lower voting contributions to the correct position/orientation values. In this case, the learning apparatus 200 can perform the specific area deletion process (step S2472) in the following manner.

More specifically, the learning apparatus 200 calculates a voting contribution to the correct position/orientation values for each of the detected area combinations corresponding to all viewpoints based on the evaluation result obtained in the evaluation process (see step S2442). The learning apparatus 200 obtains a voting probability from each of the detected area combinations with respect to correct position/orientation values $X_{GTv}$ and ($N_{GTv}$, $B_{GTv}$) corresponding to the viewpoint v of the evaluation data group, using a formula similar to formula (16) described in the first exemplary embodiment. The learning apparatus 200 can use the following formula (20) to obtain a voting probability $P(X_{GTv}, N_{GTv}, B_{GTv}|T_{kv}, N_{kv}, Bk_v)$.

$$P(X_{GTv}, N_{GTv}, B_{GTv}|T_{kv}, N_{kv}, B_{kv}) = P(X_{GTv}|T_{kv})P(N_{GTv}, B_{GTv}|N_{kv}, B_{kv}) \quad (20)$$

In formula (20), $T_{kv}$, $N_{kv}$, and $B_{kv}$ represent position/orientation parameters of the detected area combination k, at the viewpoint v, obtained in the recognition processing. The learning apparatus 200 can obtain a value of formula (27) by inputting $T_{kv}$, $N_{kv}$, and $B_{kv}$ to formula (13) and formula (15). The learning apparatus 200 calculates the voting probability $P(X_{GTv}, N_{GTv}, B_{GTv}|T_{kv}, N_{kv}, Bk_v)$ for all viewpoints of the evaluation data $S_W$.

A voting contribution $C_k$ of the area combination k to the correct position/orientation is obtainable with reference to voting probabilities at all viewpoints and can be calculated, for example, using the following formula (21).

$$C_k = \max_{v \in U_k} P(X_{GTv}, N_{GTv}, B_{GTv}|T_{kv}, N_{kv}, B_{kv}) \quad (21)$$

In formula (21), $U_k$ represents a group of viewpoints at which the area combination v has been detected among all viewpoints of the evaluation data. Alternatively, the learning apparatus 200 can obtain the voting contribution $C_k$ to the correct position/orientation as an n-th order moment that can be expressed using the following formula (22).

$$C_k = \frac{1}{|U_v|}\sum_{v \in U_k} P^n(X_{GTv}, N_{GTv}, B_{GTv}|T_{kv}, N_{kv}, B_{kv}) \quad (22)$$

In formula (22), n represents the order of the moment. Formula (20) is a mean value obtainable if n=1 and a root mean square obtainable if n=2. If the above-described voting contribution $C_k$ to the correct position/orientation does not reach a predetermined value, the learning apparatus 200 determines that the area combination k has small influence on the correct position/orientation and deletes the area combination k from a selected area combination list.

One of the above-described methods or any combination thereof is employable as an area deletion method. Further, in the present exemplary embodiment, the learning apparatus 200 performs the specific area addition process (see step S2452) at earlier timing compared to the specific area deletion process (see step S2472). However, the order of the processes to be performed by the learning apparatus 200 is not limited to the above-described example and can be changed appropriately.

As described above, the specific area selection system according to the present exemplary embodiment can select specific areas and area combinations thereof that are required to perform the recognition processing. The specific area selection system according to the present exemplary embodiment adds specific areas if the number of specific area candidates is insufficient and, therefore, can surely improve a recognition success rate at a lower calculation cost, without any bias that may caused by the difference in viewpoint.

At the same time, the specific area selection system according to the present exemplary embodiment deletes unnecessary area combinations and specific areas that may cause erroneous recognition. In other words, the specific area selection system according to the present exemplary embodiment can select high-performance specific areas and area combinations, which can be derived from the trade-off between the recognition success rate and the erroneous recognition.

As a result of the above-described mutual interaction, the specific area selection system according to the present exemplary embodiment can select optimum specific areas and area combinations required to estimate the position and orientation of a target object accurately from a plurality of viewpoints, in such a way as to improve the overall recognition results at all viewpoints, more specifically, to simultaneously satisfy both of requirements relating to the improvement of recognition success rate and the reduction of error detection rate.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-259318 filed Nov. 19, 2010, which is hereby incorporated by reference herein in its entirety.

What is claimed is:

1. An information processing apparatus, comprising:
a selection unit configured to select a plurality of specific areas of a target object;
a learning unit configured to learn a detection model that relates to each of the plurality of specific areas;
a generation unit configured to generate an area combination as a combination of specific areas selected from the plurality of specific areas;
a recognition unit configured to recognize the target object based on the detection model and the area combination; and an addition unit configured to add a new specific area based on a recognition result obtained by the recognition unit, wherein the learning unit is configured to further learn a detection model that relates to the new specific area if the new specific area is added by the addition unit.

2. The information processing apparatus according to claim 1, further comprising:

a deletion unit configured to delete an unnecessary specific area from the specific areas selected by the selection unit or the new specific area added by the addition unit based on a recognition result obtained by the recognition unit.

3. The information processing apparatus according to claim 1, wherein the specific area is a predetermined size of local area that partly constitutes the target object obtained as a three-dimensional model.

4. The information processing apparatus according to claim 1, wherein the recognition unit is configured to recognize the target object by causing the detection model to detect the specific areas of the target object from input information relating to the target object, detecting an area combination as a combination of a plurality of detected specific areas, performing recognition processing on the detected area combination, and integrating the recognition result.

5. The information processing apparatus according to claim 1, wherein the selection unit is configured to select a plurality of local areas of a three-dimensional model, which is visible from a predetermined viewpoint, as specific areas.

6. The information processing apparatus according to claim 1, wherein the learning unit is configured to learn, with respect to the plurality of specific areas selected by the selection unit, the detection model relating to each of the plurality of specific areas based on learning data.

7. The information processing apparatus according to claim 1, wherein the learning unit is configured to learn, with respect to the specific area added by the addition unit, the detection model relating to the specific area based on learning data.

8. The information processing apparatus according to claim 4, wherein the recognition unit is configured to obtain a recognition result of the learning data by performing recognition processing using the detection model and the area combination.

9. The information processing apparatus according to claim 6, wherein the learning data is information relating to the target object obtained from a plurality of viewpoints.

10. The information processing apparatus according to claim 9, wherein the plurality of viewpoints are viewpoints approximated as a geodesic dome.

11. The information processing apparatus according to claim 9, wherein the plurality of viewpoints are viewpoints obtained according to a pre-distribution that relates to an orientation corresponding to a layout condition of the target object.

12. The information processing apparatus according to claim 1, wherein the addition unit is configured to add the new specific area based on a specific area detection result obtained by the detection model, for a viewpoint at which a non-detection of the target object has occurred as a recognition result obtained by the recognition unit.

13. The information processing apparatus according to claim 2, wherein the deletion unit is configured to delete an unnecessary specific area based on a voting contribution of an area combination in recognition processing performed by the recognition unit, for a viewpoint at which an erroneous recognition of the target object has occurred as a recognition result obtained by the recognition unit.

14. The information processing apparatus according to claim 2, wherein the deletion unit is configured to calculate an evaluation value relating to a plurality of viewpoints of each area combination with reference to a recognition result obtained by the recognition unit and delete an unnecessary specific area based on the calculated evaluation value.

15. The information processing apparatus according to claim 2, wherein the deletion unit is configured to delete an unnecessary specific area based on a voting contribution relating to a plurality of viewpoints of each area combination with reference to a recognition result obtained by the recognition unit.

16. The information processing apparatus according to claim 1, wherein the recognition unit is configured to recognize at least one of a position and an orientation of the target object.

17. The information processing apparatus according to claim 4, wherein the input information includes at least one of image information and three-dimensional information of the target object.

18. The information processing apparatus according to claim 9, wherein the information relating to the target object includes at least one of image information and three-dimensional information obtained from a three-dimensional model.

19. An information processing method that is executable by an information processing apparatus, the information processing method comprising:

selecting a plurality of specific areas of a target object;

learning a detection model that relates to each of the plurality of specific areas;

generating an area combination as a combination of specific areas selected from the plurality of specific areas;

recognizing the target object based on the detection model and the area combination;

adding a new specific area based on a recognition result; and further learning a detection model that relates to the new specific area if the new specific area is added.

20. A non-transitory computer-readable storage medium storing a program that causes a computer to execute an information processing method, the program comprising:

computer-executable instructions for selecting a plurality of specific areas of a target object;

computer-executable instructions for learning a detection model that relates to each of the plurality of specific areas;

computer-executable instructions for generating an area combination as a combination of specific areas selected from the plurality of specific areas;

computer-executable instructions for recognizing the target object based on the detection model and the area combination;

computer-executable instructions for adding a new specific area based on a recognition result; and computer-executable instructions for further learning a detection model that relates to the new specific area if the new specific area is added.

* * * * *